United States Patent [19]

Cardinal

[11] 4,343,609

[45] Aug. 10, 1982

[54] CHESS INSTRUCTION APPARATUS

[76] Inventor: David V. Cardinal, 1536 Applewood Rd., Mississauga, Ontario, Canada, L5E 2M3

[21] Appl. No.: 257,337

[22] Filed: Apr. 24, 1981

[51] Int. Cl.³ .......................... G09B 19/22; A63F 3/02
[52] U.S. Cl. .................................... 434/128; 273/238; 340/323 R
[58] Field of Search ................ 434/128; 273/237, 238; 340/323 R

[56] References Cited

U.S. PATENT DOCUMENTS

| | | | |
|---|---|---|---|
| 2,679,397 | 5/1954 | Thacker | 273/237 |
| 3,395,463 | 8/1968 | Worden et al. | 434/128 |
| 3,579,856 | 5/1971 | Way | 434/128 |
| 3,683,363 | 8/1972 | Khlebutin | 273/238 X |
| 3,697,076 | 10/1972 | Vogel | 273/238 |
| 3,760,404 | 9/1973 | Khlebutin | 273/238 X |
| 3,854,725 | 12/1974 | Cluck | 273/238 |
| 3,888,491 | 6/1975 | Bernard et al. | 273/237 |
| 3,893,671 | 7/1975 | Gardner | 273/238 |
| 4,019,745 | 4/1977 | Mustelier | 273/237 |
| 4,082,285 | 4/1978 | Bathurst | 273/237 |

*Primary Examiner*—William H. Grieb
*Attorney, Agent, or Firm*—Ridout & Maybee

[57] ABSTRACT

A chess instruction apparatus comprises a board defining a playing area consisting of an array of playing squares, and a plurality of playing pieces of opposing colors. Each playing square contains a spacial configuration of switches, the configuration being the same in each square, and each playing piece provides a set of switch actuating members positioned to engage selected ones of said switches when the playing piece is placed on the square, the switch actuating members being arranged in a coded configuration corresponding uniquely to the color and function of the playing piece. A plurality of display circuits are provided to display the pattern of control, each display circuit being assigned to a respective playing square and being operable to denote control of the square by a playing piece.

11 Claims, 8 Drawing Figures

CHESS INSTRUCTION APPARATUS

This invention relates to an apparatus intended primarily for use in the teaching of chess, the apparatus comprising basically a chessboard with display means operable by the playing pieces for indicating which squares are controlled, i.e. under attack, by such playing pieces.

The pattern of squares controlled by any playing piece in a chess game depends upon a number of factors, including the position of the square on which the playing piece is placed, the functional character of the playing piece, i.e. whether it be a King or a Queen, a Knight etc., and the positions of intervening pieces, the last two being variable factors. Clearly, any signalling system for indicating the squares under attack from all possible positions on the board must have a very large number of possible signalling channels, and such channels must be capable of being selectively activated in successively different combinations as the game proceeds.

It is an object of the present invention to provide such a system.

According to the present invention, a chess instruction apparatus comprises a board defining a playing area consisting of an array of playing squares, and a plurality of playing pieces of opposing colours. Each playing square contains a spacial configuration of switches, the configuration being the same in each square, and each playing piece provides a set of switch actuating members positioned to engage selected ones of said switches when the playing piece is placed on the square, the switch actuating members being arranged in a coded configuration corresponding uniquely to the colour and function of the playing piece. A plurality of display circuits are provided to display the pattern of control, each display circuit being assigned to a respective playing square and being operable to denote control of the square by a playing piece. A circuit network controlled by the switches and providing a network of unidirectional current paths interconnects the display circuits with a current supply, the switches being selectively operable by the playing pieces for closing selected current paths through the network whereby to actuate selected display circuits according to the squares on which playing pieces are placed and the configurations of their respective switch actuating members.

The apparatus preferably includes a mode selector switch operable to enable the display circuits in either of two operating modes whereby a user can readily ascertain which squares are controlled by pieces of one colour and which squares are controlled by pieces of the opposing colour. The two operating modes of a display circuit are most conveniently provided by having pair of indicator lamps, readily distinguishable from one another by colour, which can be selectively enabled by the mode selector switch.

In this specification the term "colour" is used to denote the characteristic feature by which the opposing sets of playing pieces are distinguished from one another. The term "function" is used to denote the pattern of permissible moves characteristic of a given playing piece.

In order that the invention may be readily understood, one embodiment thereof will now be described by way of example with reference to the accompanying drawings, in which.

Figure 1:
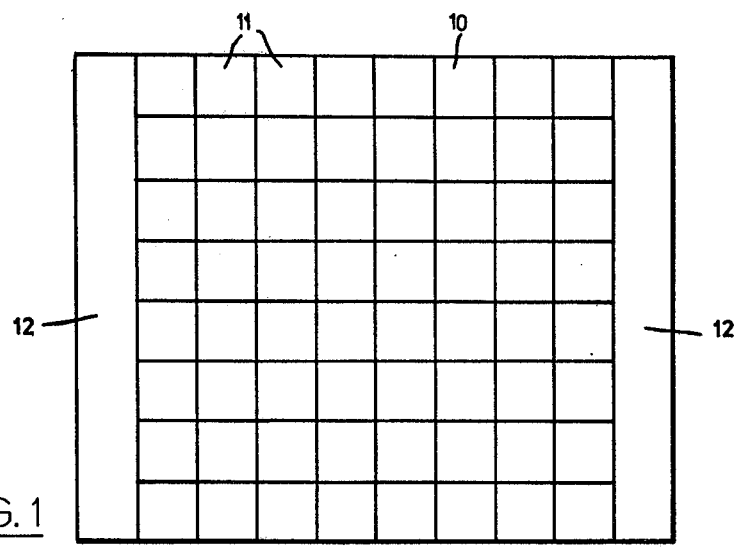
FIG. 1 is a plan view of a chessboard providing a playing area.
Figure 2:
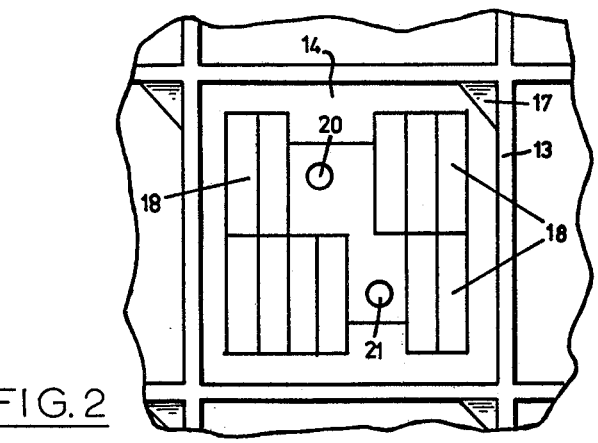
FIG. 2 is an enlarged plan view of one of the playing squares.
Figure 3:
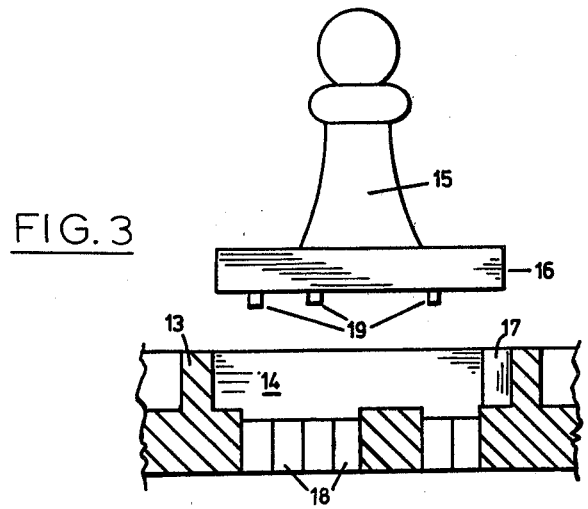
FIG. 3 is a cross-sectional view of one of the squares with a portion of a playing piece.

Referring to FIGS. 1, 2 and 3, the chessboard provides a conventional playing area 10 consisting of a square array of sixty-four playing squares 11. Support structure 12 shown at the sides of the playing area supports circuits boards (not shown) beneath the playing area, these boards carrying the hardware of signalling circuitry to be described hereinafter.

The structure of the chessboard is such that each square 11 is bounded by a peripheral step 13, which defines a locating recess 14 for locating a playing piece 15. Each playing piece 15 has a base portion 16 conforming to the shape of the recess. Preferably, the conforming shapes of the recess and the playing piece are such that the piece can only be inserted in one way, for example as illustrated in FIGS. 2 and 3, by providing a stop 17 at one corner of the recess and a complementary cut-off at the appropriate corner of each playing piece base portion.

Located within each square are a number of switches 18, the switches being arranged in a predetermined spacial configuration which is the same for each square. Each playing piece 15 provides a set of switch actuating members in the form of pins or short projections 19 extending from the underside of its base portion and positioned so that, when the playing piece is properly located on a square, each pin 19 will engage the particular switch 18 with which it is aligned and thus actuate the switch. The switches are thus actuated selectively according to the number and positions of the pins 19 on the base portion. These are arranged differently for different playing pieces in such a way that, for each playing piece, the configuration of switch actuating members corresponds uniquely to the colour and the function of the playing piece. Thus, the selective actuation of the switches 18 serves to decode the configuration of switch actuating members thereby to identify the particular piece.

Figure 4:
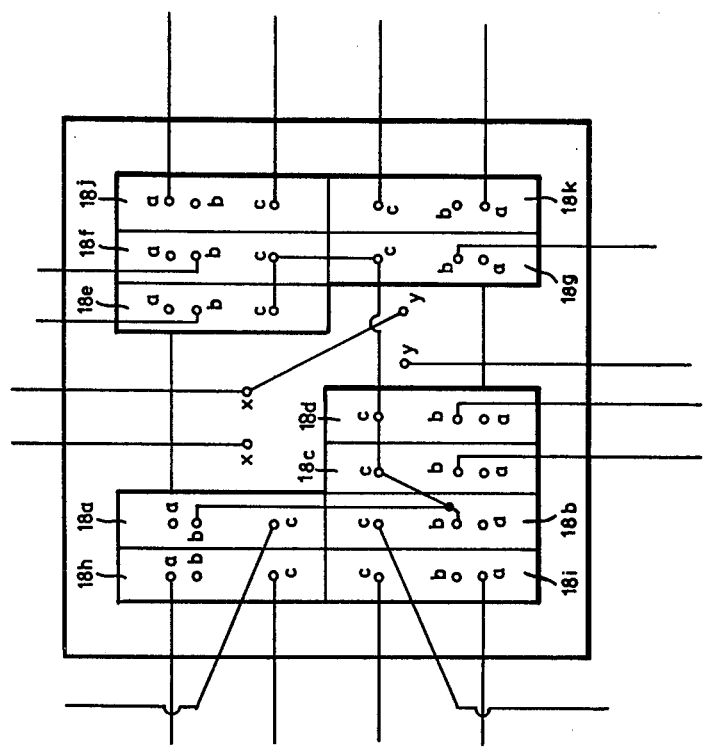
FIG. 4 is a plan view of one of the squares showing switch connections therein.

The switches may suitably be microswitches (such as Archer Switches Catalogue No. 275-016), each providing a normally open contact which is closed by actuation of the switch, a normally closed contact which is opened by actuation of the switch, and a common terminal. The switches 18 of each square, being selectively actuated as described above, initiate the transmission of a signal denoting the presence of a particular playing piece on the square. This signal is received at various stations assigned to the respective squares which are under direct attack by the playing piece, so as to operate display circuits. Since the playing piece may be of either colour, e.g. black or white, each display circuit preferably has two modes of operation which are selected according to the colour of the playing piece. Thus, in the illustrated embodiment, the display means is represented by a pair of differently coloured lamps 20, 21 located within each square, the lamps being selectively operable as hereinafter described to denote that the square is under attack by a playing piece of the respective colour. FIG. 4 shows the electrical connections to the terminals of the switches 18 and the lamps 20, 21. In this figure the lamp terminals are denoted by the letters x, x and y, y; the common terminals of the switches are denoted by the letter c; and the terminals of the normally closed contacts and of the normally open contacts are denoted by the letters a and b respectively. It will be seen that each switch has one terminal which is not connected.

The configuration of eleven microswitches shown in FIG. 4 comprises a pair of normally open "control" switches 18a, 18b which are selectively operable by each playing piece according to colour; five normally open "function" switches 18c, 18d, 18e, 18f, and 18g which are selectively operable by playing pieces according to function, and four "interruptor" switches 18h, 18i, 18j, and 18k which are operated by all playing pieces regardless of colour and function of the pieces. At this point it should be mentioned that although the switch configuration is the same for all squares, the interruptor switches of squares adjacent to the edges of the playing area are not connected as they serve no purpose for such squares. Also, it may be mentioned that although there are six possible functions of playing pieces, the Queen duplicates the functions of both a Rook and a Bishop, and so only five function switches are required.

As will become apparent, the switches 18 of each square constitute a system of gates interconnected to provide the signalling circuit of the square. Thus, the control switches 18a, 18b serve to select the appropriate display mode according to the colour of the playing piece located on the square. The purpose of the function switches is to signal the presence of a detected playing piece to all squares controlled by the playing piece, by gating the various possible current paths through a signalling network interconnecting the display circuits with a current supply. The purpose of the interruptor switches is to interrupt signals which would otherwise be transmitted to squares protected by intervening playing pieces. Each interruptor switch must therefore be operated by any such intervening piece. A discovered attack by movement of an intervening piece from its position will be displayed by release of the interruptor switch to close the relevant current path.

Figure 5:
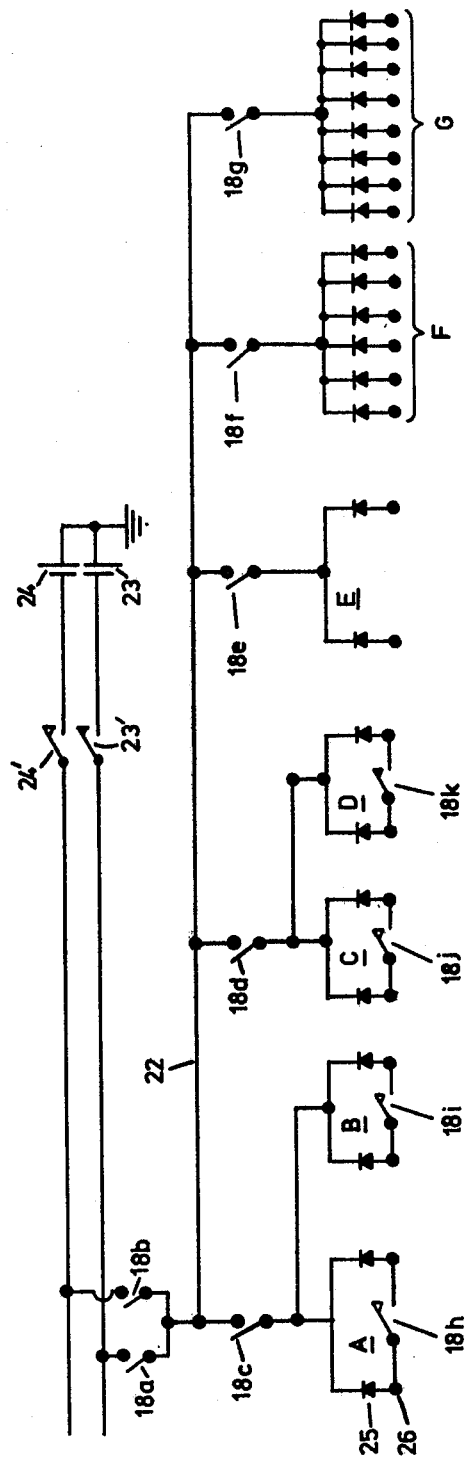
FIG. 5 is a wiring diagram of the signalling circuits of an individual square.

FIG. 5 is a wiring diagram of the signalling circuitry of an individual square. Each signalling circuit has a bus 22 connected via the control switch 18a to a current source 23 via a normally open, momentarily operated switch 23', and alternatively connected via the control switch 18b and a normally open, momentarily operated switch 24' to a current source 24. The switches 23' and 24' are operated manually by the players. The bus 22 is connected via the function switches 18c, 18d, 18e, 18f, and 18g to the node points of star connected sets of diodes 25, each set being connected to a corresponding set of buses shown at terminals 26. For convenience, the respective systems each comprising a set of diodes 25 and output buses 26 are indicated by the letters A, B, C, D, E, F, G.

Signals generated by the signalling circuit are received by the display circuits of related squares as will be described subsequently. For the present it should be mentioned that operation of the function switch 18c will activate the output buses 26 of the systems A and B. The output buses of system A are connected to the input terminals of the display circuits of all squares lying on a diagonal containing the controlling square. Similarly, the output buses of system B are connected to the input terminals of the display circuits of all squares lying on the other diagonal.

The function switch 18d is operated by a Queen and a Rook. Therefore, the output buses 26 of system C are connected to the input terminals of the display circuits of all squares on the same rank as the controlling square, and the output buses of system D are connected to the input terminals of the display circuits of all squares in the same file.

The function switch 18e is operated by a King and by a Pawn. The output terminals of system E are connected to the display input terminals of two diagonally adjacent forward squares only.

The function switch 18f is operated only by a King. The output buses 26 of the system F are therefore connected to the display input terminals of adjacent squares other than the two diagonally adjacent squares controlled by system E.

Finally, the function switch 18g is controlled by a Knight. As a Knight can control up to eight squares, the input terminals of the display circuits of those squares are connected respectively to the output buses 26 of system G.

It will be noted that the pairs of output buses of systems A, B, C, and D are interconnected by the interruptor switches 18h, 18i, 18j and 18k. These switches serve to interconnect the display circuits of squares in a row, or a file, or a diagonal, while permitting the interruption of a signalling path by an intervening piece.

Figure 6:
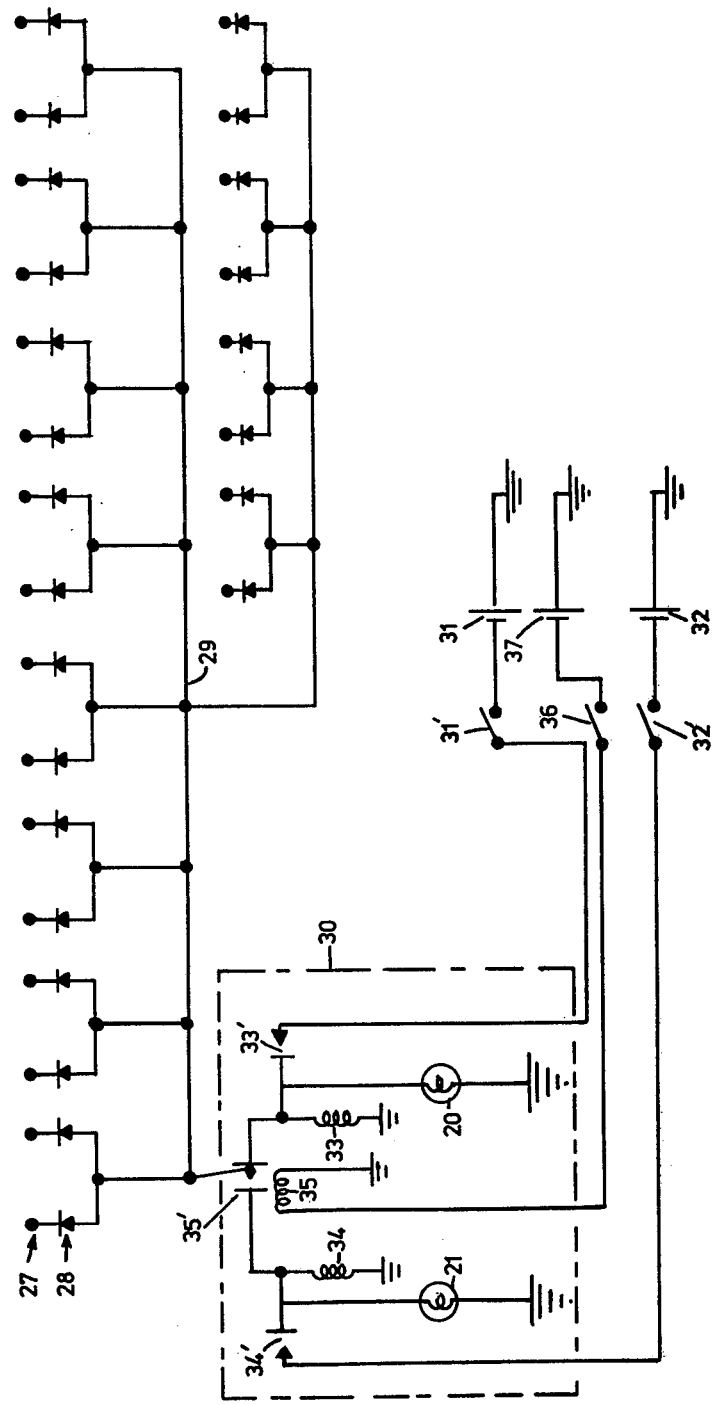
FIG. 6 is a wiring diagram of the display circuit of an individual square.

Referring to FIG. 6, each display circuit has twelve pairs of input terminals 27, each pair of input terminals being connected to a respective pair of output buses of the signalling circuits of potentially controlling squares. Thus, each pair of input terminals 27 will receive an input signal from a related square on which a playing piece is located. The input terminals 27 are connected through diodes 28 to a bus 29. When a signal is received on any input terminal, the bus 29 will be at a negative potential, being connected to the current source 23 or 24. (The current sources 23 and 24 are, of course, common to all the signalling circuits.)

A received signal will activate the display circuit 30, which includes the two indicator lamps 20, 21. These lamps are activated from respective current sources 31, 32 via the contacts 33', 34', of respective self-holding relays 33, 34. The current source 31 is connected to relay contact 33' via normally closed contacts of a momentarily open switch 31'. Similarly, the current source 32 is connected to relay contact 34' via normally closed contacts of a momentarily open switch 32'. Each player, before making a new move, presses a respective one of the switches 31', 32' thereby to clear the display lamp 20 or 21 which indicates control of the particular square by his pieces. On receipt of a signal, the relay 33 or 34 will be operated according to the position of a relay contact 35' of a relay 35. The position of the contact 35' depends upon the setting of a mode selector switch 36 which determines whether or not the relay 35 is to be energized from a current source 37. During play, the switch 36 will be set to the open or closed position according to whether black or white is about to make a move, thereby enabling the appropriate lamp 20 or 21 to receive the signal relating to that move. Since the relay coils 33, 34 are in parallel with the lamps 20, 21, the circuits of these relays are self-holding and so the existing board display will remain even though signal current only flows while the momentary switch 23' or 24' is being operated.

It will be appreciated that the output buses 26 (FIG. 5) of the signalling circuits of all sixty-four squares and the input terminals 27 of all sixty-four display circuits are selectively interconnected by a complex matrix of connections. However, the interconnections are of just two basic types, illustrated in FIG. 7 and FIG. 8 respectively.

Figure 7:
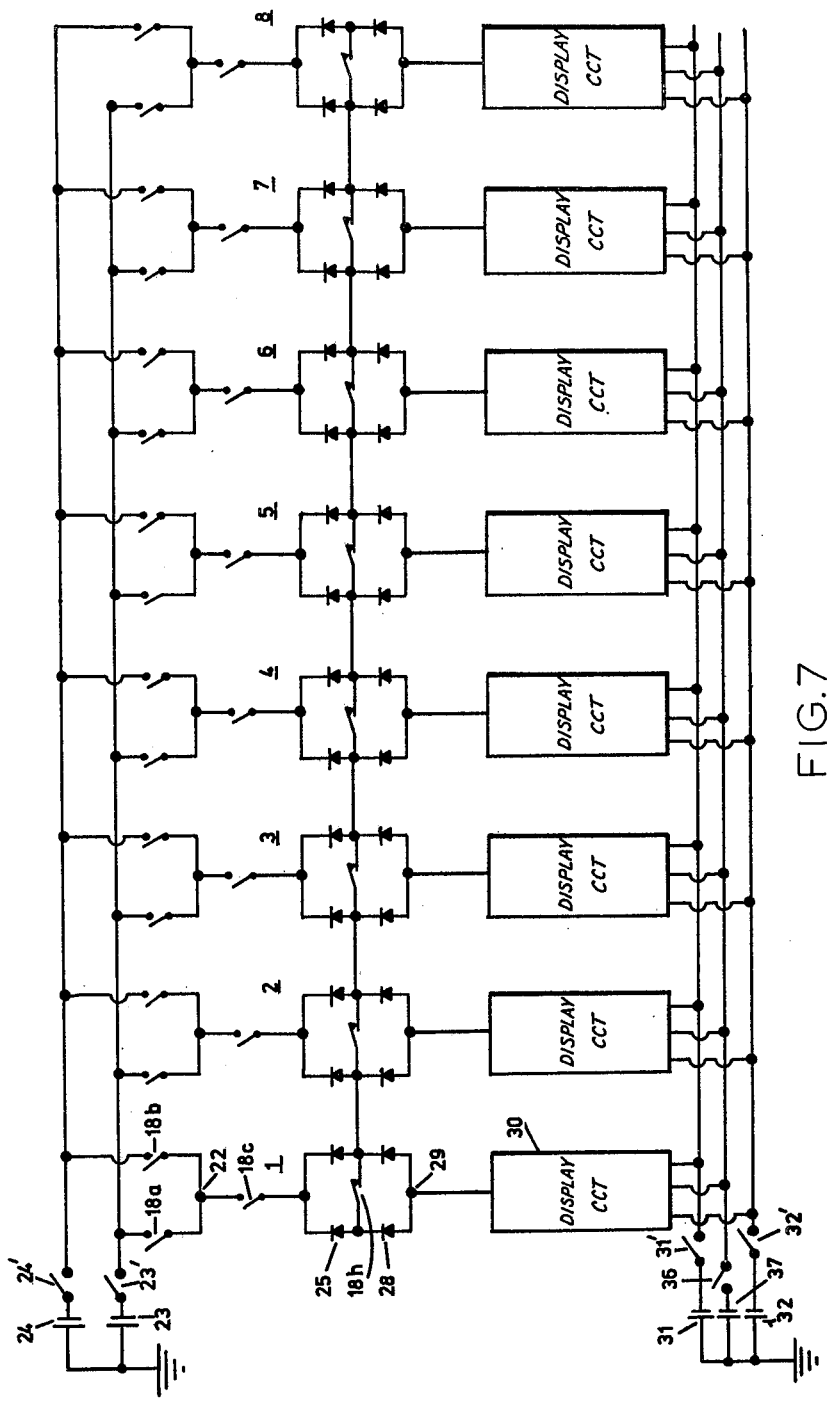
FIG. 7 is a wiring diagram showing the interconnections of one set of functionally related squares.

Referring to FIG. 7, this relates to the interconnections of squares contained in a common rank, file or diagonal. Associated with each square is a system comprising a portion of its signalling circuit containing the relevant function switch and output buses, and the display circuit 30 with the relevant pair of input terminals. The systems of the eight squares are identical and are numbered 1 to 8 respectively. The overall circuit is the same for each rank, file and diagonal, except that for all but two diagonals there will be fewer than eight squares. In this example it is assumed that the squares 1 to 8 lie on a major diagonal, the relevant function switches being the switches 18c and the relevant output buses being those of the diode system A. It is readily apparent that the presence of a Queen or a Bishop on any one of the squares will operate the relevant function switch 18c, thereby activating all the output buses via the closed interruptor switches 18h and so activating all the display circuits in the appropriate mode according to the setting of mode selector switch 36. However, the presence of a playing piece on any intervening square will open the interruptor switch 18h of that square, and so the display signal will be interrupted by one of the diodes 28. Thus, if a Rook, for example, is placed on square 6, the interruptor switch of that square will be opened. If a Bishop or a Queen is now placed on square 1 or square 2, the display circuits 30 of all the squares 1 to 6 will be activated, but no signal will reach the display circuits 30 of squares 7 and 8.

Figure 8:
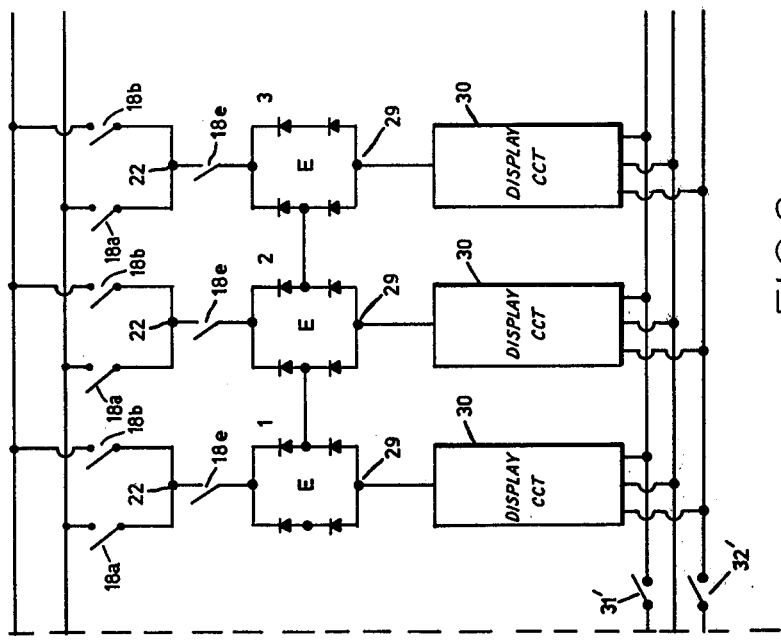
FIG. 8 is a wiring diagram showing the interconnections of another set of interrelated squares.

The system of interconnections illustrated in FIG. 7 and described above is applicable to all signalling circuits controlled by the function switches 18c, 18d. The system of interconnections of signalling circuits controlled by the function switches 18e, 18f and 18g is illustrated in FIG. 8. Since a Pawn can control one pair of diagonally adjacent squares, and a King can control four pairs of adjacent squares, and a Knight can control four pairs of squares, it is possible to represent each signalling circuit controlled by one of these pieces by an interconnection between the transmitting circuit of a controlling square and the display circuits of one pair of controlled squares. FIG. 8 illustrates, for simplicity, the essentials of one such elemental interconnection. The three squares are numbered 1', 2' and 3' for convenience. In this example it is assumed that the controlling playing piece is a Pawn. Therefore we need to consider the signalling circuits controlled by the function switches 18e. If a Pawn is placed on the square 2', the control switch 18a or 18b of that square will be operated, depending upon the colour of the Pawn. The function switch 18e of square 2' will also be operated, thereby activating the output buses of system E for the square. Therefore, when the player signals, the display circuit 30 of squares 1' and 3' will be activated to indicate that those squares are controlled by the Pawn. If the square 2' is at the edge of the board, the operation will be the same except that there will be no display system corresponding to square 1' and only the display circuit 30 of square 3' will be operated.

The function switch 18e is also operated by a King on the square, and its presence will be signalled in the same manner to the diagonally adjacent squares 1' and 3'. However, the presence of the King is also signalled to six other squares via three pairs of signalling circuits corresponding to that of FIG. 8, this additional signalling being initiated by the function switch 18f of FIG. 5. Thus, the presence of a King on a square is signalled by the operation of the function switches 18e and 18f to a maximum of eight squares by four pairs of signalling circuits. Similarly, the presence of a Knight on a square, by operation of the function switch 18g, and when the player signals, is signalled to the display circuit of a maximum of eight squares by way of four pairs of signalling circuits. The signalling requirements for all possible configurations of play will be obvious to those who understand the game of chess. The signalling is accomplished by the selective gating of current paths through a circuit network, the network being reducable to a system of elemental circuit connections as described with reference to FIGS. 7 and 8.

What I claim is:

1. A chess instruction apparatus comprising:
   means defining a playing area consisting of an array of playing squares,
   each playing square containing a spacial configuration of switches, the configuration being the same in the square,
   a plurality of playing pieces of opposing colors,
   each playing piece providing a set of switch actuating members positioned to engage selected ones of said switches when the playing piece is placed on the square, the switch actuating members being arranged in a coded configuration corresponding uniquely to the color and function of the playing piece,
   a display system consisting of a plurality of display circuits, each display circuit being assigned to a respective playing square and being operable to denote control of the square by a playing piece,
   a circuit network controlled by said switches, said circuit network providing a network of unidirectional current paths interconnecting said display circuits with a current supply,
   said switches being selectively operable by said playing pieces for closing selected current paths through the network whereby to activate selected display circuits according to the squares on which playing pieces are placed and the configurations of switch actuating members of such playing pieces.

2. A chess instruction apparatus according to claim 1, wherein each display circuit is selectively operable in a first mode or a second mode to denote control of the assigned square by a playing piece of a respective colour, the display system including a mode selector switch connected with said display circuits for selectively enabling the display circuits in either mode of operation.

3. A chess instruction apparatus according to claim 2, wherein each display circuit comprises a pair of distinguishable indicator lamps and switching means responsive to the mode selector switch for selectively connecting the indicator lamps in circuit with the current supply.

4. A chess instruction apparatus according to claim 3, wherein each display circuit further comprises a pair of self-holding relays responsive to said switching means, each self-holding relay being operable to hold the supply connection of a respective indicator lamp.

5. A chess instruction apparatus according to claim 4, further comprising a pair of normally closed, momentarily operated, signal switches, each signal switch being connected in circuit with a respective one of said self-holding relays of each display circuit, said signal switches being selectively operable to cancel the display designating control of squares by pieces of a respective colour.

6. A chess instruction apparatus according to claim 4, wherein the indicator lamps of each display circuit are located within the square to which they are assigned.

7. A chess instruction apparatus according to claim 5, wherein each playing square is bounded by a peripheral step defining a locating recess, each playing piece having a base portion conforming to the shape of the recess for location thereby.

8. A chess instruction apparatus according to claim 6, wherein said switch actuating members are constituted by projections on the underside of said base portion.

9. A chess instruction apparatus according to claim 5, wherein the switches of each square comprise a pair of control switches selectively operable by said playing pieces according to colour, and a plurality of function switches selectively operable by said playing pieces according to function, said current paths being gated by selective operation of said switches by the playing pieces.

10. A chess instruction apparatus according to claim 9, wherein the switches of each square further comprise a plurality of interruptor switches each operable by a playing piece placed on the square, each interruptor switch being connected in a respective current path interconnecting the display circuit of a controlled square with a function switch of a controlling square separated therefrom by the intervention of such playing piece.

11. A chess instruction apparatus according to claim 10, wherein the switches of each square comprise five said function switches and four said interruptor switches, the five said function switches being operable, respectively, by a Queen or a Bishop, by a Queen or a Rook, by a King or a Pawn, by a King, and by a Knight, the interruptor switches being operable of all such pieces.

* * * * *